United States Patent Office 3,249,550
Patented May 3, 1966

3,249,550
GLASS CLEANING COMPOSITIONS
Norman T. Metters, Greensboro, N.C., assignor to Dow Corning Corporation, Midland, Mich., a corporation of Michigan
No Drawing. Filed May 27, 1964, Ser. No. 370,714
3 Claims. (Cl. 252—161)

This application is a continuation-in-part of application Serial No. 156,965, filed December 4, 1961, now abandoned.

This invention relates to a composition of matter which is particularly suitable for use on eye glasses as a cleaning and anti-fogging agent.

One of the perennial problems which people who wear glasses have, is the fogging of the glasses when they come into a warm room after being in cold weather. This problem of fogging is also bothersome with respect to automobile windshields, mirrors and other glass objects through which people must see. One of the primary characteristics of any material which is applied to a sight glass is that it must not cause smearing or clouding of the glass. Thus, there are many materials which will prevent fogging but which are not practical for use because they give a greasy film on the glass surface.

It is also highly advantageous to have a material which not only prevents fogging, but also cleanses the glass when it is applied. In order to obtain the best cleansing, it is preferable that the material applied to the glass froth upon application. This is particularly beneficial when the cleanser is to be applied from a spray dispenser since the foaming action prevents or reduces run off of the cleansing material.

Applicant has found that the formulation described below meets all of the requirements of an improved glass cleaner-antifogging composition without the undesirable properties mentioned above. Accordingly, it is the object of this invention to provide an improved glass cleaning composition.

This invention relates to a composition consisting of .3 to 5 percent by weight of a water soluble salt of an alkyl sulfate having from 10 to 16 inclusive carbon atoms, from 1 to 5 percent by weight of a compound of the group monomethyl and monoethyl ethers of diethylene and dipropylene glycols, from 5 to 15 percent by weight of isopropanol and from 93.7 to 75 percent by weight water.

The above composition is made by merely mixing the ingredients.

The proportion of the alkyl sulfate employed is critical since if less than .3 percent is employed the cleaning properties of the composition are seriously impaired and if more than 5 percent by weight is employed the composition gives a greasy smear on the surface of the glass. For the purpose of this invention, any water soluble salt of any alkyl sulfate having from 10 to 16 inclusive carbon atoms is operative herein. Specific examples of such salts are sodium decyl sulfate, potassium undecyl sulfate, tetramethyl ammonium hexadecyl sulfate and ammonium lauryl sulfate. Thus, it can be seen that alkali metal, ammonium and quaternary ammonium salts are operative herein.

The second critical ingredient of the compositions of this invention are the monoalkyl ethers of alkylene glycols; namely, the monomethyl ether of diethylene glycol, the monoethyl ether of diethylene glycol, the monomethyl ether of dipropylene glycol and the monoethyl ether of dipropylene glycol. These materials enhance the cleaning action of the composition and satisfactory results are not obtained if they are employed in amount outside the above proportions.

The antifogging properties of the above composition can be enhanced by incorporating into the composition from 0.001 to 2 weight percent of a silicone glycol. Besides providing longer lasting antifogging properties to glass surfaces, the silicone also provides an antistatic property and a composition with increased ease of rub out. The silicone glycol prevents rapid accumulation of dust particles and lint. The silicone glycol also provides a composition which when applied can be easily wiped, without excessive rubbing, to a clear non-smeared surface.

The silicone glycols which are useful as an additive to the above composition must be soluble in the present composition, at least up to 2 weight percent. As the present composition contains large amounts of water, the silicone glycols are preferably water-soluble.

The above silicone glycols have a general formula selected from the group consisting of

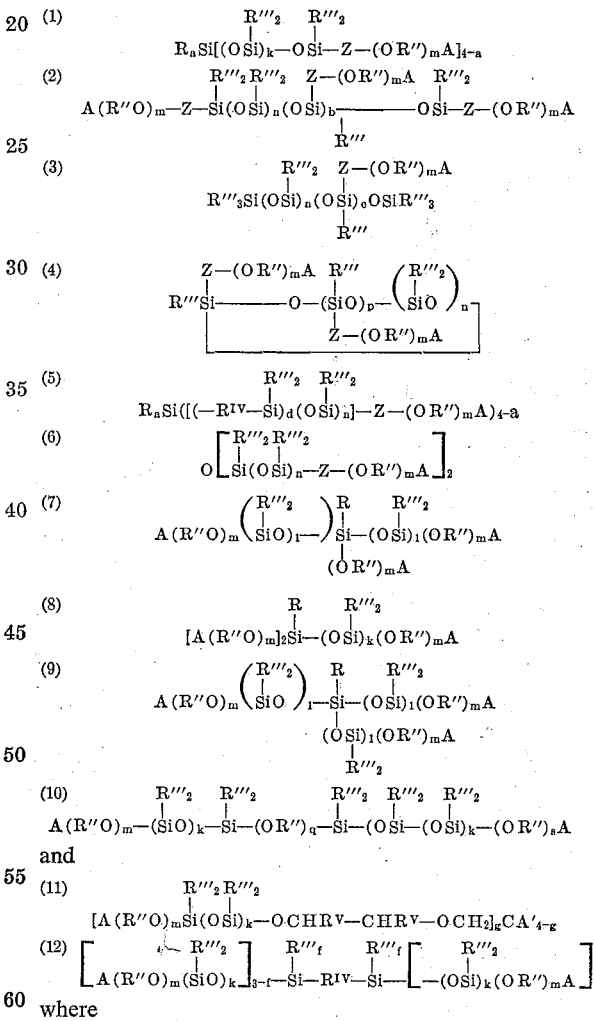

where

R is a monovalent radical selected from the group consisting of hydrocarbon radicals having from 1 to 10 inclusive carbon atoms and hydrocarbonoxy radicals having a maximum of 10 atoms exclusive of hydrogen atoms, R'' is an alkylene radical having from 2 to 4 inclusive carbon atoms, R''' is a monovalent hydrocarbon radical having from 1 to 6 inclusive carbon atoms, $R^{IV}$ is a divalent hydrocarbon radical having from 1 to 6 inclusive carbon atoms, $R^v$ is a monovalent radical selected from a group consisting of alkyl radicals having from 1 to 5 carbon atoms and hydrogen atoms, Z is a divalent radical selected from the group consisting of aliphatic and cycloaliphatic hydrocarbon radicals, hydroxylated cycloaliphatic hydrocarbon radicals, aliphatic monocarboxy acyl radicals, and aliphatic hydrocarbon hydroxy ether radicals having a maximum of 10 atoms exclusive of hydrogen atoms, A is a monovalent radical selected from the group consisting of —OH, —OR',

wherein

R' is a monovalent radical selected from the group consisting of hydrocarbon radicals and hydrocarbonoxy radicals having a maximum of 10 atoms exclusive of the hydrogen atoms, A' is a monovalent radical selected from the group consisting of —CH$_2$OH, —CH$_2$OR' hydrogen atoms, —R', —OH, —OR',

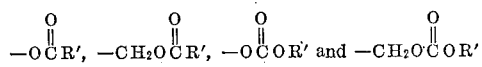

wherein

R' is a monovalent radical defined above,
$g$ is an integer from 1 to 4 inclusive,
$f$ is an integer from 0 to 2 inclusive,
$q$ is an integer of at least 1,
$s$ is an integer of at least 1,
$a$ is an integer from 0 to 3 inclusive,
$l$ is an integer of at least 1,
$n$ is a positive integer inclusive of 0,
$k$ is a positive integer such that all the $k$ values per molecule are at least 2,
$m$ is an integer of at least 1,
$b$ is an integer of at least 1,
$c$ is an integer of at least 1,
$d$ is an integer of at least 1 and
$p$ is an integer of at least 2, wherein each silicon containing fragment of the above general formulae compose a maximum of 60 weight percent of the total weight of the formula, Z is bonded to the silicon-containing fragment through silicon-carbon bonds and to other organic groups through a carbon-oxygen bond, each formula contains oxyalkylene groups of which at least 25 weight percent is oxyethylene, each silicon glycol of the above general formula has a molecular weight of at least 500 and the total R''' of each general formula contains at least 95 lower alkyl radicals per 100 R''' radicals.

The silicone glycols are known compounds which can be prepared by methods described in more detail below. In general, Formulae 1, 5, 7, 8 and 9, R is a monovalent hydrocarbon radical having from 1 to 10 carbon atoms or a monovalent hydrocarbonoxy radical having a maximum of 10 atoms exclusive of hydrogen atoms. The silicon atom to which R is bonded preferably contains only one monovalent radical with more than 4 atoms exclusive of hydrogen. Examples of R as monovalent hydrocarbon radicals are such as alkyl radicals such as methyl, ethyl, propyl, hexyl and decyl radicals; alkenyl radicals such as vinyl, allyl, and hexenyl radicals; aryl radicals such as phenyl, tolyl and xylyl radicals; cycloalkyl radicals such as cycohexyl and cyclopentyl radicals; cycloalkenyl radicals such as cyclohexenyl radicals and aralkyl radicals such as benzyl and beta-phenylethyl radicals. Examples of R as monovalent hydrocarbonoxy radicals are such as methoxy, ethoxy, isopropoxy, butoxy, allyloxy, phenoxy, benzyloxy, cyclohexyloxy and tertiary butoxy.

All of the general formulae contain R''' which is a monovalent hydrocarbon radical having from 1 to 6 inclusive carbon atoms. Examples of R''' are such as methyl, ethyl, propyl, butyl, hexyl, cyclohexyl, vinyl and phenyl. R''' is preferably methyl and/or ethyl. Of the total number of R''' radicals attached to silicon atoms in a molecule, 95 R''' radicals are lower alkyl per 100 R''' radicals. Lower alkyl radicals refer to alkyl radicals having no more than 4 carbon atoms.

In general Formulae 5 and 12, $R^{IV}$ is a divalent hydrocarbon radical having from 1 to 6 inclusive carbon atoms. $R^{IV}$ is bonded only to silicon atoms through silicon-carbon bonds. Examples of $R^{IV}$ are divalent hydrocarbon radicals such as methylene, ethylene, propylene, butylene, phenylene and cyclohexylene.

In general Formula 11, $R^v$ is a monovalent hydrocarbon radical having from 1 to 5 carbon atoms or a hydrogen atom. Examples of $R^v$ are such as methyl, ethyl, propyl, butyl and amyl.

In general Formulae 1, 2, 3, 4, 5 and 6, Z is a divalent radical selected from the group consisting of aliphatic and cycloaliphatic hydrocarbon radicals, hydroxylated aliphatic hydrocarbon radicals, hydroxylated cycloaliphatic hydrocarbon radicals, aliphatic monocarboxy acyl radicals and aliphatic hydroxy ether radicals all having a maximum of 10 atoms exclusive of hydrogen atoms. Examples of Z are such as aliphatic hydrocarbon radicals such as methylene, ethylene, propylene, propenylene, butylene, or hexylene; cycloaliphatic hydrocarbon radicals such as cyclohexylene or cyclopentylene; hydroxylated aliphatic hydrocarbon radicals such as

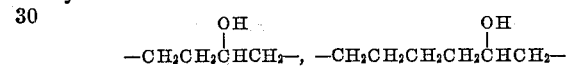

and

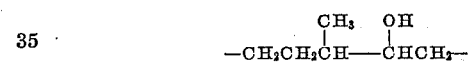

hydroxylated cycloaliphatic hydrocarbon radicals, such as

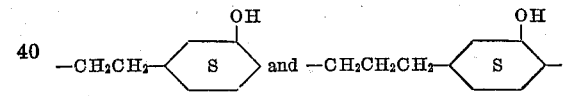

aliphatic monocarboxy acylradicals such as

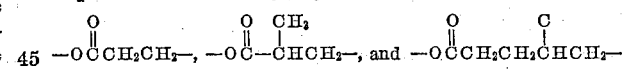

and aliphatic hydrocarbon hydroxy ether radicals such as

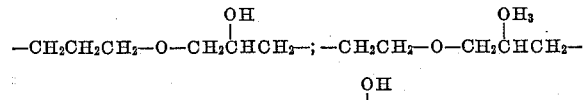

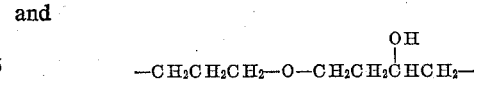

and

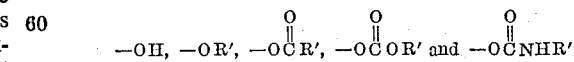

Each of the above general formulae contain A which is a monovalent radical selected from the group consisting of

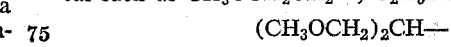

wherein R' is a monovalent radical selected from the group consisting of hydrocarbon radicals and hydrocarbonoxy radicals having a maximum of 10 atoms exclusive of hydrogen atoms. R' can be any monovalent hydrocarbon radical such as alkyl radicals such as methyl, ethyl, propyl, butyl or decyl; alkenyl radicals such as vinyl, allyl or hexenyl; aryl radicals such as phenyl, tolyl or xylyl; cycloaliphatic hydrocarbon radicals such as cyclohexyl, cyclopentyl, or cyclohexenyl; aralkyl hydrocarbon radicals such as benzyl or beta-phenylethyl. R' can also be any monovalent aliphatic hydrocarbon ether radical such as $CH_3OCH_2CH_2$—, $C_2H_5OCH_2CH_2$—, $(CH_3OCH_2)_2CH$— or

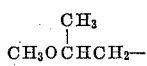

The monovalent acyl radical can be derived from any monovalent carboxylic acid such as acetic acid, propionic acid, hexoic acid, benzoic acid, phenylacetic acid, acrylic acid, methacrylic acid or cyclohexoic acid.

The general Formula 11 contains A' which is a monovalent radical selected from the group consisting of $$-CH_2OH, -CH_2OR'$$

hydrogen atoms,

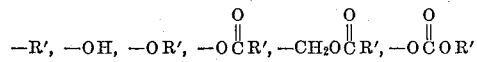

and

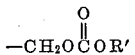

wherein R' is defined above.

Each of the above general formulae contain oxyalkylene groups which are —OR"—. The oxyalkylene groups are divalent radicals which are bonded by carbon-oxygen-carbon bonds or carbon-oxygen-silicon bonds. The oxygen atom is located in the general formulae so as to indicate the place of bonding. R" can be any alkylene radical having 2 to 4 carbon atoms such as ethylene, propylene, butylene

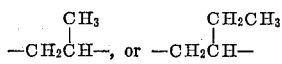

Examples of —OR"— are such as oxyethylene, oxypropylene, oxybutylene

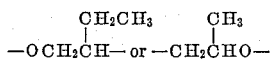

Each location of oxyalkylene groups in a molecule have at least one oxyalkylene group but it is preferable to have two or more oxyalkylene groups per location per molecule, thus, each $q$, $s$ and $m$ must be at least 1. Each molecule must contain at least 25 weight percent of the total weight of the total oxyalkylene content of oxyethylene. The solubility of the compound is critically effected if lower amounts of oxyethylene are present. Of the total oxyalkylene content, it is preferred in this invention to have at least 50 weight percent oxyethylene. Although the upper limit of the number of oxyalkylene groups per molecule is not critical, for practical purposes each molecule can contain upwards of 4000 oxyalkylene groups.

Each molecule of a silicone glycol must contain at least two silicon atoms. The silicone glycols of general Formulae 5 and 6 can contain only two silicon atoms, thus $n$ can be 0. In general Formulae 2, 3, and 4, $n$ can be 0, but the silicone glycols can have a minimum of 3 silicon atoms. Except for silicone glycols of general Formulae 5 and 6 each of the molecules must have at least 3 or 4 silicon atoms per molecule. Therefore, the silicone glycols of general Formulae 1, 8, 10, 11, and 12, are such that the total value of all $k$ subscripts must be at least 2. Likewise, the silicone glycols of general Formulae 7 and 9 are such that the value of 1 must be at least 1. The silicone glycol of general Formula 4 is a cyclic and must therefore have at least three silicon atoms, and $p$ must have a value of at least 2. The general Formulae 2 and 3 must have at least one siloxane unit of the general unit formula of

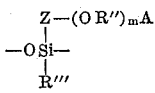

and therefore each $b$ and $c$ must have a value of at least 1.

The silicone glycol of general Formula 5 contains silicon atoms bonded through divalent hydrocarbon radicals, $R^{IV}$. The divalent hydrocarbon radicals $R^{IV}$ can be bonded to $R_aSi$—, to

or to another

each being bonded through silicon-carbon bonds. The arrangement of

units and

units can be in any form except that no $R^{IV}$ radical is bonded to silicon atoms through any other bonds except silicon-carbon bonds.

In each of the silicone glycols of the above general formulae the silicon-containing fragments must not exceed 60 weight percent of the total weight of a formula. If the silicone content exceeds 60 weight percent of the total weight of a formula, the silicone glycol precipitates from the composition of the present invention and adverse properties are realized such as smearing. Preferably, the silicone glycols contain a minimum of 5 weight percent silicon-containing fragments of the total weight of a formula.

Another limitation of the silicone glycols operable in the present invention is that the silicone glycols must have a molecular weight of at least 500 and preferably the silicone glycols have a molecular weight of 1000 or more. The silicone glycols have no maximum molecular weight as some silicone glycols will begin to precipitate sooner than others and are therefore not suitable for incorporation into the composition of the present invention. The silicone glycols have molecular weights up to 20,000 or more.

The silicone glycols which are described above are known compounds and can be prepared by known methods. Silicone glycols of the general Formulae 1, 2, 3, 4, 5 and 6 can be prepared by reacting a silicon-containing fragment which has an ≡SiH group with a terminal unsaturated glycol in the presence of chloroplatinic acid. The above method and other methods are fully described in copending applications Serial No. 127,843, filed July 31, 1961, entitled, "Silicone Glycol Branch Copolymers" by Loren A. Haluska and Serial No. 335,411, filed January 2, 1964, entitled, "Method of Preparing Polyurethane Foams" by Clyde L. Whipple, both of which are herein fully incorporated by reference. Methods for preparing silicone glycols of the general Formulae 7, 8, 9, 10, 11, and 12, is fully described in U.S. Patent 2,834,748, British Patents Nos. 953,628 and 954,041, all of which are herein fully incorporated by reference.

The above silicone glycols can also be diluted with glycols such as polyglycols such as $HO(CH_2CH_2O)_xH$, $HO(CH_2CH_2CH_2)_xH$ or $CH_3O(CH_2CH_2)_xH$ where $x$ is a positive integer. The above polyglycols can be purchased commercially. The silicone glycols are usually not diluted with more than 30 weight percent based on the silicone glycols of polyglycols. These mixtures are operative in the composition of the present invention.

7

The examples are illustrative only and should not be construed as limiting the invention which is properly delineated in the appended claims.

Example 1

A mixture was prepared consisting of 1.66 percent by weight sodium lauryl sulfate added in the form of Orvus WA Paste, 3 percent by weight of the monomethyl ether of dipropylene glycol, 15 percent by weight isopropanol and 80.44 percent by weight water. The mixture was a clear solution which when applied to glass cleaned the surface quite readily. It left no smearing on the surface and could be readily applied from a spray dispenser.

The glass treated with this material showed little or no fogging when the glass at 70° F. was immediately exposed to an atmosphere saturated with water vapor at a temperature of 84° F.

Example 2

Equivalent results are obtained when the following sulfates are substituted in the composition of Example 1: sodium decyl sulfate, sodium hexadecyl sulfate and tetramethylammonium lauryl sulfate.

Example 3

Equivalent results are obtained when the following materials are substituted in the composition of Example 1: the monomethyl ether of diethylene glycol, the monoethyl ether of diethylene glycol and the monoethyl ether of dipropylene glycol.

Example 4

A mixture was prepared consisting of 1.66 weight percent sodium lauryl sulfate added in the form of Orvus WA Paste, 2 weight percent of monomethyl ether of dipropylene glycol, 10 weight percent of isopropanol, 0.5 weight percent of

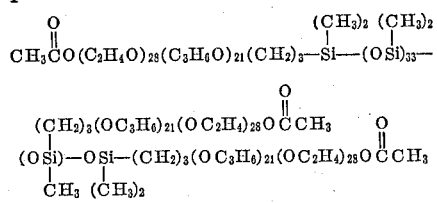

and 85.84 weight percent of water. The mixture was a clear solution which when applied to glass cleansed the surface easily and wiped clear without leaving a smear.

The glass treated with the above composition showed no fogging when the glass at 70° F. was immediately exposed to an atmosphere saturated with water vapor at a temperature of 84° F. The glass showed no fogging after three such fogging cycles.

8

Example 5

The following compositions were used in treating glass as described in Example 4. Similar results were obtained:

COMPOSITION A

| | Weight percent |
|---|---|
| Sodium lauryl sulfate | 1.66 |
| Monomethyl ether of dipropylene glycol | 2.0 |
| Isopropanol | 10.0 |

| | |
|---|---|
| Water | 85.84 |

COMPOSITION B

| | Weight percent |
|---|---|
| Sodium lauryl sulfate | 1.66 |
| Monomethyl ether of dipropylene glycol | 2.0 |
| Isopropanol | 10.0 |
| Silicone glycol of Example 4 | 1.0 |
| Water | 85.34 |

Example 6

When any of the following silicon glycols are substituted for the silicone glycol in Example 4, equivalent results are obtained:

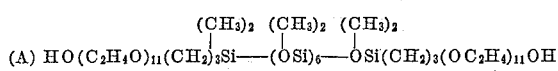

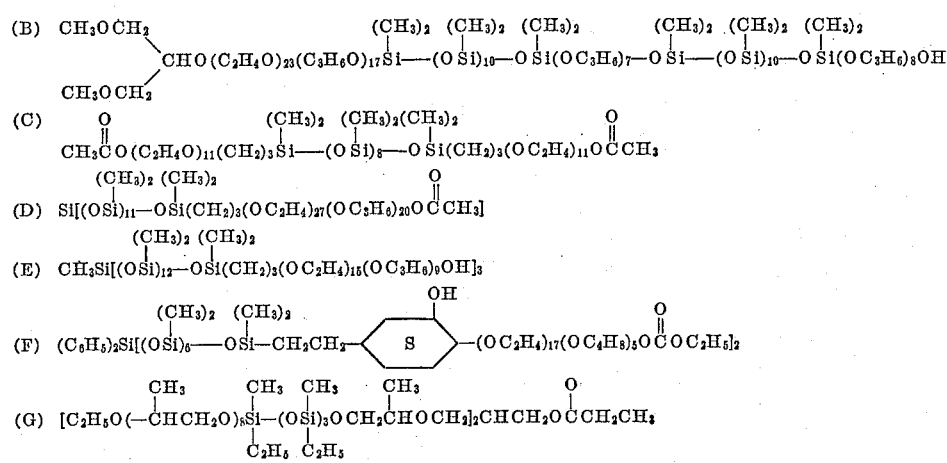

Example 7

When the following compositions are used in treating glass according to the method of Example 4, equivalent results are obtained:

(A)

| | Weight percent |
|---|---|
| Tetramethylammonium hexadecyl sulfate | 0.8 |
| Monomethyl ether of dipropylene glycol | 4.0 |
| Isopropanol | 11.0 |
| Silicone glycol of Example 6(F) | 0.1 |
| Water | 84.1 |

(B)

| | Weight percent |
|---|---|
| Potassium undecyl sulfate | 3.0 |
| Monomethyl ether of dipropylene glycol | 3.0 |
| Isopropanol | 12.0 |
| Silicone glycol of Example 6(A) | 1.5 |
| Water | 80.5 |

That which is claimed is:

1. A composition of matter suitable for cleaning of glass and for providing anti-fogging properties on glass consisting of from .3 to 5 percent by weight of a water soluble salt of an alkyl sulfate having from 10 to 16 inclusive carbon atoms,
from 1 to 5 percent by weight of a compound selected from the group consisting of the monomethyl and monoethyl ethers of diethylene and dipropylene glycols,
from 5 to 15 percent by weight isopropanol,
from 93.7 to 75 percent by weight water and
from 0.001 to 2 weight percent of a silicone glycol of the general formula selected from the group consisting of

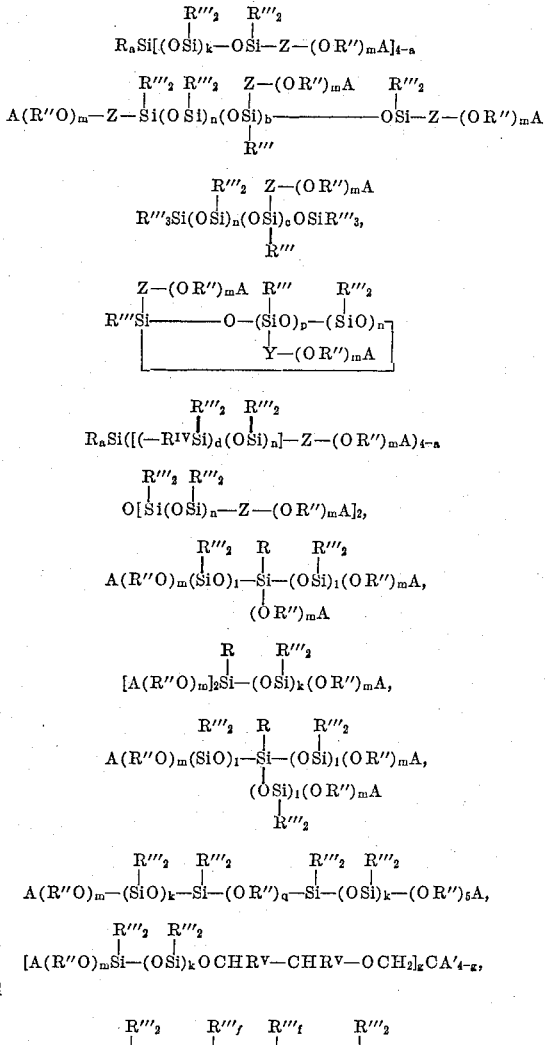

where

R is a monovalent radical selected from the group consisting of hydrocarbon radicals having from 1 to 10 inclusive carbon atoms and hydrocarbonoxy radicals having a maximum of 10 atoms exclusive of hydrogen atoms,
R" is an alkylene radical having from 2 to 4 inclusive carbon atoms,
R''' is a monovalent hydrocarbon radical having from 1 to 6 inclusive carbon atoms,
R$^{IV}$ is a divalent hydrocarbon radical having from 1 to 6 inclusive carbon atoms,
R$^V$ is a monovalent radical selected from a group consisting of alkyl radicals having from 1 to 5 carbon atoms and hydrogen atoms, Z is a divalent radical selected from the group consisting of aliphatic and cycloaliphatic hydrocarbon radicals, hydroxylated aliphatic hydrocarbon radicals, hydroxylated cycloaliphatic hydrocarbon radicals, aliphatic monocarboxy acyl radicals, and aliphatic hydrocarbon hydroxy ether radicals having a maximum of 10 atoms exclusive of hydrogen atoms,
A is a monovalent radical selected from the group consisting of

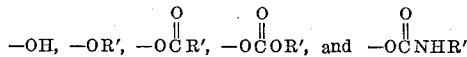

wherein

R' is a monovalent radical selected from the group consisting of hydrocarbon radicals and aliphatic hydrocarbon ether radicals having a maximum of 10 atoms exclusive of the hydrogen atoms,
A' is a monovalent radical selected from the group consisting of —CH$_2$OH, —CH$_2$OR', hydrogen atoms, —R', —OH, —OR',

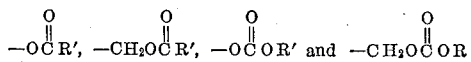

wherein

R' is a monovalent radical defined above,
g is an integer from 1 to 4 inclusive,
f is an integer from 0 to 2 inclusive,
q is an integer of at least 1,
s is an integer of at least 1,
a is an integer from 0 to 3 inclusive,
l is an integer of at least 1,
n is a positive integer inclusive of 0,
k is a positive integer such that all the k values per molecule are at least 2,
m is an integer of at least 1,
b is an integer of at least 1,
c is an integer of at least 1,
d is an integer of at least 1 and
p is an integer of at least 2, wherein each silicon-containing fragment of the above general formulae compose a maximum of 60 weight per cent of the total weight of the formula, Z is bonded to the silicon-containing fragment through silicon-carbon bonds and to other organic groups through a carbon-oxygen bond, each formula contains oxyalkylene groups of which at least 25 weight per cent is oxyethylene, each silicone glycol of the above general formula has a molecular weight of at least 500 and the total R''' of each general formula contains at least 95 lower alkyl radicals per 100 R''' radicals.

2. An anti-fogging composition for glass surfaces consisting of from 0.3 to 5 percent by weight of sodium lauryl sulfate,
from 1 to 5 percent by weight of monomethyl ether of dipropylene glycol,
from 5 to 15 percent by weight isopropanol,
from 93.7 to 75 percent by weight water and
from 0.001 to 2 weight percent of

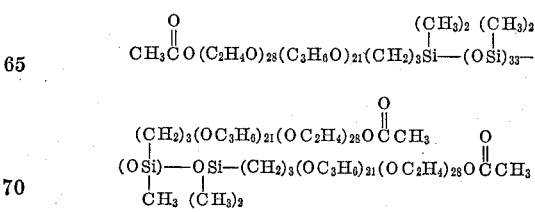

3. An anti-fogging composition for glass surfaces consisting of
from 0.3 to 5 percent by weight of sodium lauryl sulfate, from 1 to 5 percent by weight of monomethyl ether of dipropylene glycol,
from 5 to 15 percent by weight isopropanol,
from 93.7 to 75 percent by weight water and
from 0.001 to 2 weight percent of

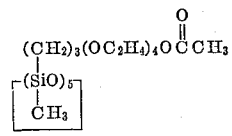

References Cited by the Examiner

UNITED STATES PATENTS

| | | | |
|---|---|---|---|
| 1,968,797 | 7/1934 | Bertsch | 252—161 XR |
| 2,292,097 | 8/1942 | Vollmer | 106—13 |
| 2,353,978 | 7/1944 | Weber | 106—13 |
| 2,365,297 | 12/1944 | Schweizer | 106—13 |
| 2,834,748 | 5/1958 | Bailey et al. | 252—77 XR |

FOREIGN PATENTS 524,987   12/1944   Great Britain.

OTHER REFERENCES

The Condensed Chemical Dictionary, Rheinhold Pub. Corp., New York (6th edition) (1961) (page 409).

Bennett, "The Chemical Formulary," Chemical Pub. Co., Inc., New York, vol. X, page 275.

Emulsions and Detergents, Union Carbide Co., New York, 1955 (page 11).

"Modern Glass Cleaners," Soap and Sanitary Chemicals, Sept. 1952, pages 46–49 and 105.

"Synthetic Organic Chemicals," Union and Carbon Chemicals Corp., New York, 10th ed., 1940, page 28.

JULIUS GREENWALD, *Primary Examiner.*

J. T. FEDIGAN, *Assistant Examiner.*

UNITED STATES PATENT OFFICE
CERTIFICATE OF CORRECTION

Patent No. 3,249,550                                    May 3, 1966

Norman T. Metters

It is hereby certified that error appears in the above numbered patent requiring correction and that the said Letters Patent should read as corrected below.

Column 2, lines 22 and 23, for that portion of the formula reading

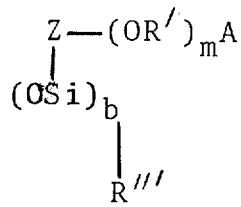      read      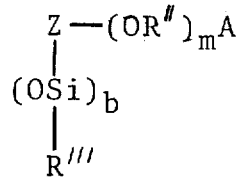

same column 2, lines 40 to 41, for that portion of the formula reading

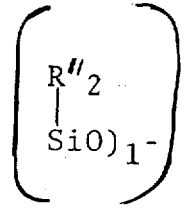      read      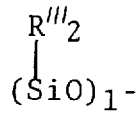

same column 2, lines 58 and 59, for that portion of the formula reading

      read      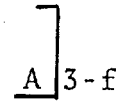

column 3, line 5, after "radicals," insert -- hydroxylated aliphatic hydrocarbon radicals, --; column 4, lines 44 and 45, the right-hand formula should appear as shown below instead of as in the patent:

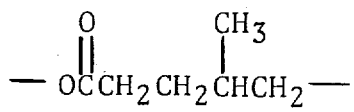

3,249,550 same column 4, lines 48 and 49, the right-hand formula should appear as shown below instead of as in the patent:

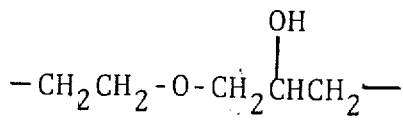

column 6, line 69, for "$HO(CH_2CH_2CH_2)_xH$ or $CH_3O(CH_2CH_2)_xH$" read -- $HO(CH_2CH_2CH_2O)_xH$ or $CH_3O(CH_2CH_2O)_xH$ --; column 8, lines 10 to 16, the formula should appear as shown below instead of as in the patent:

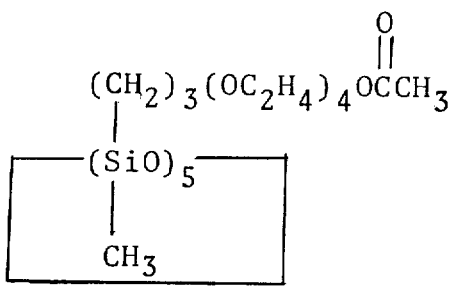

same column 8, lines 33 and 34, formula (A) should appear as shown below instead of as in the patent:

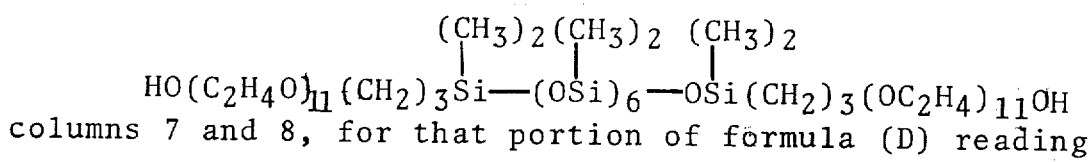

columns 7 and 8, for that portion of formula (D) reading

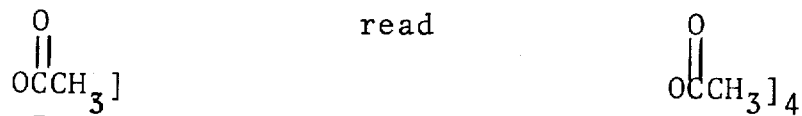

same columns 7 and 8, for that portion of formula (G) reading

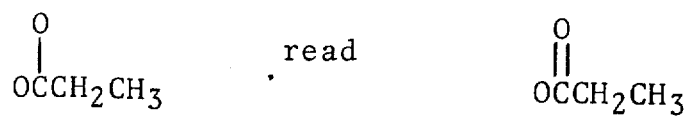

column 9, lines 28 to 31, for that portion of the formula reading

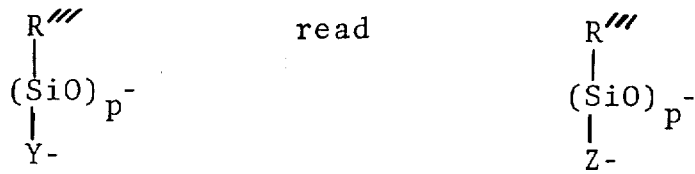

3,249,550 same column 9, lines 51 and 52, for that portion of the formula reading "-(OR")₅A" read -- -(OR")₅A --; column 10, lines 23 and 24, the right-hand formula should appear as shown below instead of as in the patent:

$$-CH_2OCOR'\ \ \text{with}\ \ \overset{O}{\underset{\|}{C}}$$

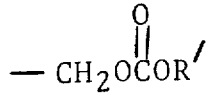

Signed and sealed this 15th day of August 1967.

(SEAL)
Attest:

EDWARD M. FLETCHER, JR.
Attesting Officer

EDWARD J. BRENNER
Commissioner of Patents